(12) United States Patent
Park et al.

(10) Patent No.: US 7,684,822 B2
(45) Date of Patent: Mar. 23, 2010

(54) MOBILE TERMINAL AND METHOD FOR CHANGING MODE THEREOF

(75) Inventors: Wan-Kyu Park, Seoul (KR); Ji-Sun Yang, Suwon (KR); Bo-Hyun Song, Daegu (KR)

(73) Assignee: LG Electronics Inc., Seoul (KR)

( * ) Notice: Subject to any disclaimer, the term of this patent is extended or adjusted under 35 U.S.C. 154(b) by 672 days.

(21) Appl. No.: 11/593,092

(22) Filed: Nov. 6, 2006

(65) Prior Publication Data

US 2007/0103443 A1 May 10, 2007

(30) Foreign Application Priority Data

Nov. 7, 2005 (KR) .................. 10-2005-0105927
May 1, 2006 (KR) .................. 10-2006-0039313

(51) Int. Cl.
*H04M 1/00* (2006.01)
(52) U.S. Cl. .............. 455/550.1; 455/575.1; 455/575.3; 455/575.4
(58) Field of Classification Search .............. 455/575.1, 455/575.2, 575.3, 575.4, 550.1, 562.1
See application file for complete search history.

(56) References Cited

U.S. PATENT DOCUMENTS

| | | | |
|---|---|---|---|
| 2003/0013417 A1* | 1/2003 | Bum ........................... | 455/90 |
| 2003/0064758 A1* | 4/2003 | Mizuta et al. ................ | 455/566 |
| 2004/0121825 A1* | 6/2004 | Ma et al. .................. | 455/575.4 |
| 2004/0157647 A1* | 8/2004 | Takahashi .................... | 455/566 |
| 2005/0130715 A1* | 6/2005 | Fujisawa .................. | 455/575.1 |
| 2005/0181820 A1 | 8/2005 | Ono | |
| 2005/0237703 A1* | 10/2005 | Angelhag .................... | 361/683 |
| 2006/0019726 A1* | 1/2006 | Park et al. ................ | 455/575.1 |
| 2006/0050168 A1* | 3/2006 | Okada et al. ........... | 348/333.06 |
| 2006/0098813 A1 | 5/2006 | Takamori et al. | |
| 2007/0072659 A1* | 3/2007 | Ryu ........................ | 455/575.3 |

FOREIGN PATENT DOCUMENTS

| | | | |
|---|---|---|---|
| DE | 10109102 A1 | | 9/2002 |
| DE | 1768357 | * | 9/2005 |
| EP | 1298890 A2 | | 4/2003 |
| EP | 1564971 A1 | | 8/2005 |
| EP | 1768357 A2 | | 3/2007 |
| JP | 2001-156893 A | | 6/2001 |
| JP | 2003348205 | * | 5/2002 |
| WO | WO-2005/026562 A1 | | 3/2005 |
| WO | WO-2005/104505 A1 | | 11/2005 |

* cited by examiner

*Primary Examiner*—Kamran Afshar
(74) *Attorney, Agent, or Firm*—Birch, Stewart, Kolasch & Birch, LLP (57) ABSTRACT

A mobile terminal including a first body, a second body covering at least a portion of the first body, and a hinge module disposed to be eccentric to one of upper left and right sides between the first and second bodies and configured to the allow the second body to be horizontally rotatable with respect to the first body.

21 Claims, 10 Drawing Sheets

MOBILE TERMINAL AND METHOD FOR CHANGING MODE THEREOF

This application claims priority to Korean Patent Application No. 10-2005-0105927 filed on Nov. 7, 2005 in Korea and No. 10-2006-0039313 filed on May 1, 2006, the entire contents of which are hereby incorporated by reference in their entireties.

BACKGROUND OF THE INVENTION

1. Field of the Invention

The present invention relates to a mobile terminal having a rotating body and a method of changing a screen mode of the terminal based on the rotating body.

2. Description of the Related Art

Mobile terminals such as a mobile phone, Personal Digital Assistance (PDA), etc. allow users to communicate with each other virtually anywhere and at anytime. Mobile terminals also provide various other functions in addition to general call services such as providing access to the Internet, providing video services so a user can watch a video, etc. Accordingly, the role of the display in the mobile terminal is becoming more important.

For example, some current models of mobile terminals include a display that can be horizontally rotated so a user can view a broadcasted television show, for example. However, one problem with these types of mobile terminals is that the rotated display covers a large portion of a main body thereby limiting the size of a keypad provided on a main body of the mobile terminal.

SUMMARY OF THE INVENTION

Accordingly, one object of the present invention is to address the above-noted and other problems.

Another object of the present invention is to provide a mobile terminal including a rotatable display that leaves a larger portion of the main body open so a larger keypad can be used.

To achieve these and other advantages and in accordance with the purpose of the present invention, as embodied and broadly described herein, the present invention provides in one aspect a novel mobile terminal including a first body, a second body covering at least a portion of the first body, and a hinge module disposed to be eccentric to one of upper left and right sides between the first and second bodies and configured to the allow the second body to be horizontally rotatable with respect to the first body.

In another aspect, the present invention provides a method for changing a screen mode of a mobile terminal. The method includes maintaining a call standby in a state that a second body of the mobile terminal is closed over a first body, sensing at least one from a rotation direction and a rotation angle of the second body when the second body is rotated with respect to the first body, and changing the screen mode of the mobile terminal based on the sensed at least one from the rotation direction and the rotation angle.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Reference will now be made in detail to the preferred embodiments of the present invention, examples of which are illustrated in the accompanying drawings.

Figure 1:
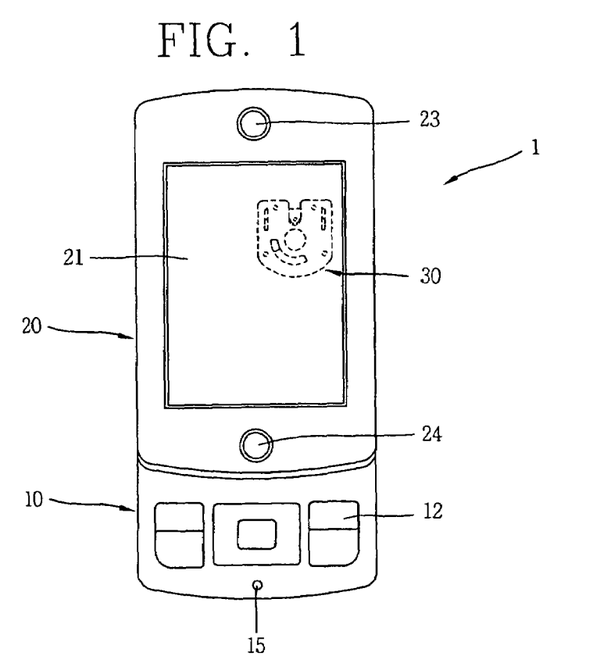
FIG. 1 is a plan view illustrating a mobile terminal according to a first embodiment of the present invention.

Turning first to FIG. 1, which is a plan view illustrating a mobile terminal 1 according to a first embodiment of the present invention. As shown in FIG. 1, the mobile terminal 1 includes a first body 10 and a second body 20 connected with each other such that the second body 20 can be horizontally rotated over the first body. In more detail, the mobile terminal 1 includes a hinge module 30 installed at an upper right hand corner between the first and second bodies 10 and 20 such that the second body 20 can be horizontally rotated.

Further, the location of the hinge module 30 advantageously allows a large open area to exist on the first body 10. Note that the location of the hinge module 30 may also be at an upper left hand corner between the first and second bodies 10 and 20. In addition, the right and left sides refer to the right and left direction in FIG. 1 and the upper and lower sides refer to the upper and lower direction in FIG. 1.

In addition, as shown in FIG. 1, the second body 20 has a smaller length that the first body 10 such that when the second body 20 is closed with respect to the first body 10, a portion of the first body 10 is exposed. In addition, a keypad 12 is formed in the exposed portion. The mobile terminal 1 also includes a microphone 15 at a lower front end of first body 10, and first and second speakers 23 and 24 at upper and lower front ends the second body 20, respectively. The second body 20 also includes a display 21.

Therefore, the user can receive or call another party's outgoing call or incoming call using the keypad 12, microphone 15 and speakers 23 and 24 without opening the second body 20. In addition, when the second body 20 is rotatably opened, the first speaker 23 is also rotated thereby providing the user with a stereo sound by interworking with the second speaker 24.

Figure 2:
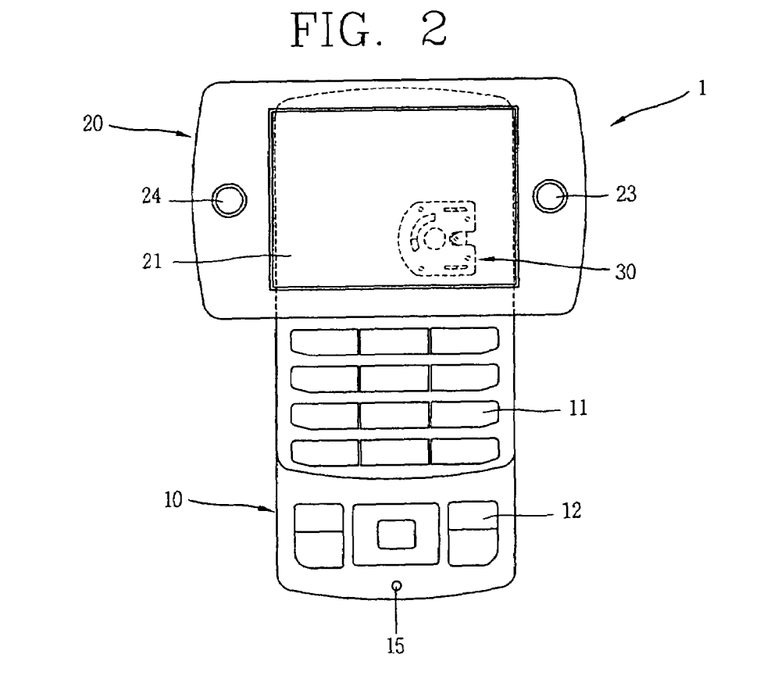
FIG. 2 is a plan view illustrating a rotated display body of the mobile terminal shown in FIG. 1.

In more detail, FIG. 2 is a plan view illustrating the second body 20 being in an opened state after being rotated 90° clockwise from the closed state illustrated in FIG. 1. As shown in FIG. 2, the mobile terminal 1 also includes a keypad 11 formed on the front surface of the first body 10. As shown, the keypad 11 is exposed when the second body 20 is rotated 90°. The keypad 12 is also exposed (i.e. the keypad 12 is always exposed).

Further, the first keypad 11 includes a plurality of keys with numbers, English characters, etc. that the user can select to enter information. The keypad 12 includes directional keys, a send key, a menu key, search key, etc. that the user can use to select a particular function or menu. Therefore, the user can receive or call another party's outgoing call or incoming call using the first key11 and/or the keypad12 when the second body 20 is rotatably opened. In addition, the keypads 11 and 12 may be a push-type keypad operated in a pushing manner or a touch-type keypad operated in a touching manner.

Therefore, and with reference to FIGS. 1 and 2, because the hinge module 30 is eccentrically disposed at the upper right hand corner between the first and second bodies 10 and 20, the keypad 11 has a relatively large area. That is, the related art rotating mobile terminals include a hinge module positioned at the center of the mobile terminal, which reduces the amount of area available for a keypad on the first body.

In addition, the hinge module 30 is disposed at a position such that when the first and second bodies are in a closed position as in FIG. 1, the top portions of the first and second bodies 10 and 20 coincide with each other. This type of configuration forms a bar type mobile terminal. In addition, as shown by a dotted line in FIG. 2, when the second body 20 is rotated, the side edge portion of the second body 20 is higher than the top edge portion of the first body 10, thereby forming a T-shaped mobile terminal.

In addition, the display 21 displays a vertical screen when the second body 20 is closed with respect to the first body 10 as shown in FIG. 1 and displays a horizontal screen when the second body 20 is opened with respect to the first body 10 as shown in FIG. 2. In the opened state, the user can easily perform an editing operation in text transmitting mode, enjoy a video in VOD mode, or television program in broadcasting mode, etc. on the display 21.

Figure 3:
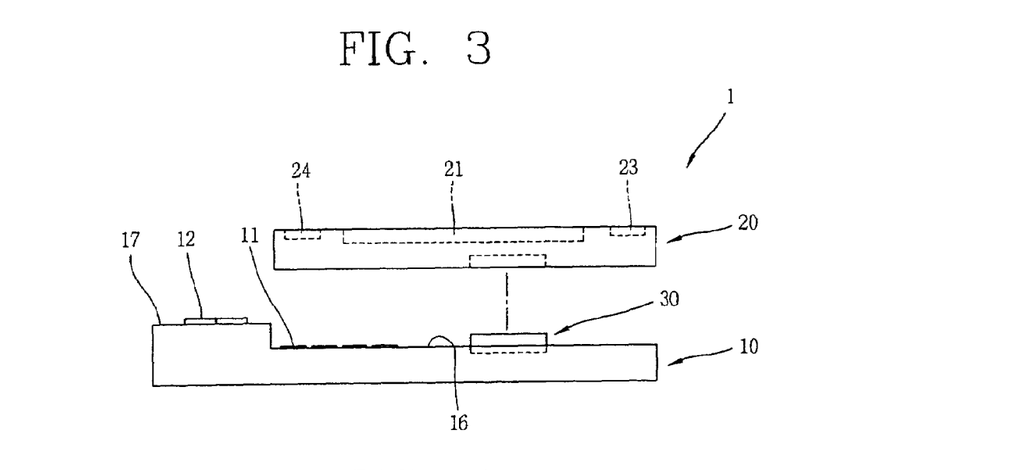
FIG. 3 is an exploded side view illustrating the mobile terminal in FIG.1.
Figure 4:
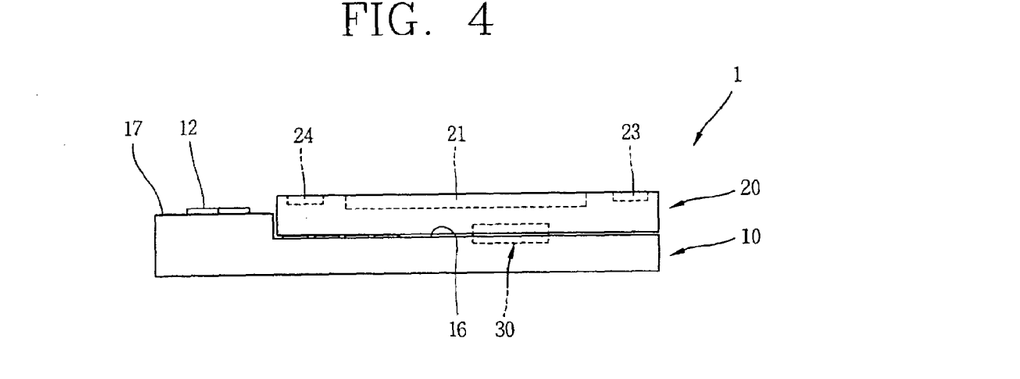
FIG. 4 is an assembled side view illustrating the mobile terminal in FIG. 1.

Turning next to FIGS. 3 and 4, which are an exploded side view and an assembled side view respectively illustrating the mobile terminal shown in FIGS. 1 and 2. As shown, the mobile terminal 1 includes a keypad mounting portion 17 for mounting the keypad 12 that is always exposed (i.e., when the second body 20 is opened and closed). Also included is another keypad mounting portion 16 disposed next to and below the keypad mounting portion 17 for mounting the keypad 16. Accordingly, as shown in FIG. 4, the second body 20 is mounted inwardly from the second keypad mounting portion 17 and thus is mechanical stable. Note also that in FIG. 4 an upper surface of the second body 20 is higher than an upper surface of the first body 10 (i.e., higher than an upper surface of the keypad mounting portion 17 of the first body 10).

Figure 5:
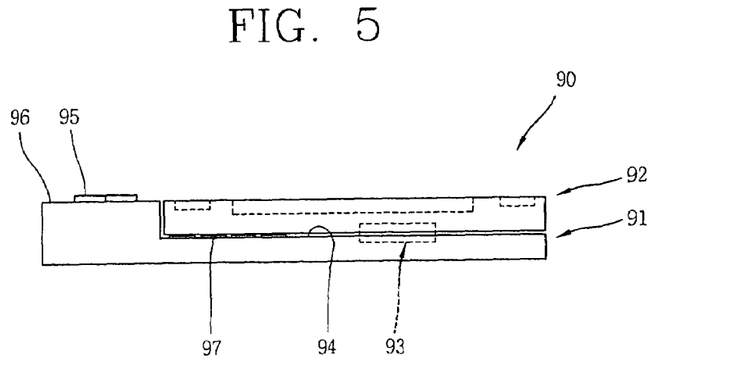
FIG. 5 is a side view of a mobile terminal according to another embodiment of the present invention

Next, FIG. 5 is a side view illustrating a mobile terminal 90 according to another embodiment of the present invention. In this embodiment, an upper surface of a second body 92 of the mobile terminal 90 has the same height as an upper surface of a keypad mounting portion 96 for mounting a mounting keypad 95. FIG. 5 also illustrates a keypad mounting portion 94 for mounting another keypad 97 and a hinge module 93. Accordingly, with the configuration shown in FIG. 5, the mobile terminal 90 has a simpler appearance and better stability.

Figure 6:
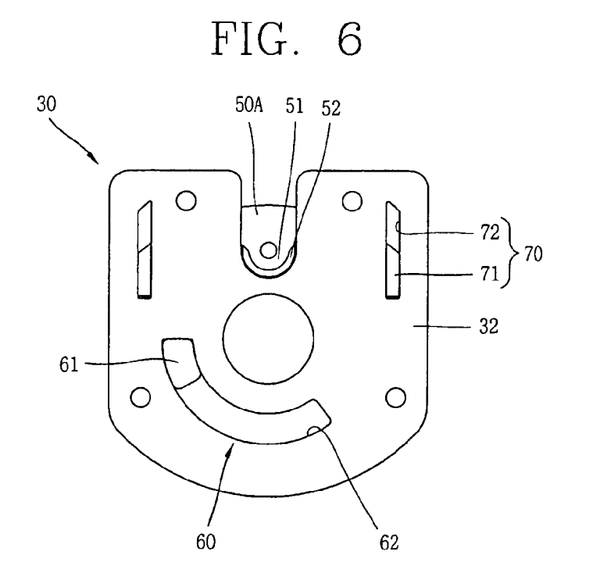
FIG. 6 is a plan view illustrating a hinge module included in the mobile terminal in FIG. 1.
Figure 7:
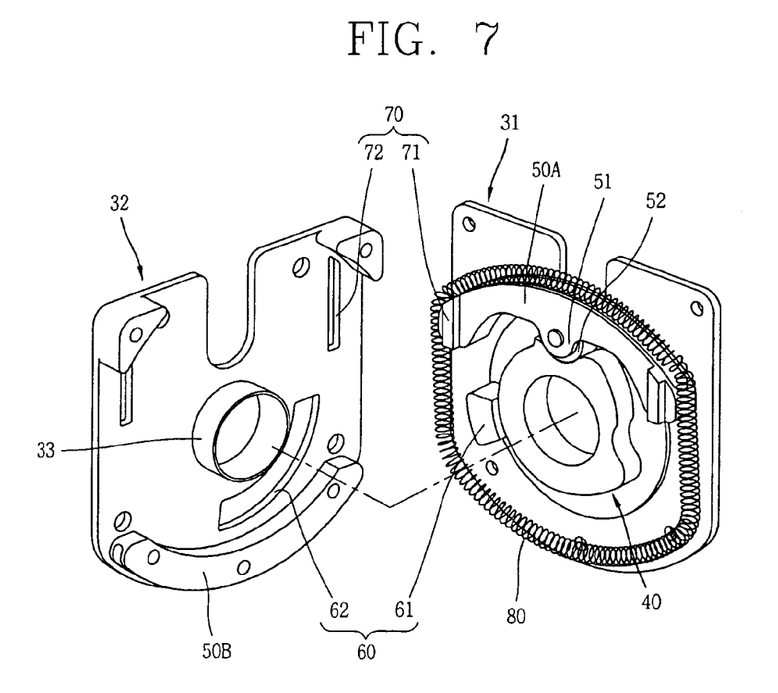
FIG. 7 is a partial exploded perspective view illustrating the hinge module in FIG. 6.
Figure 8:
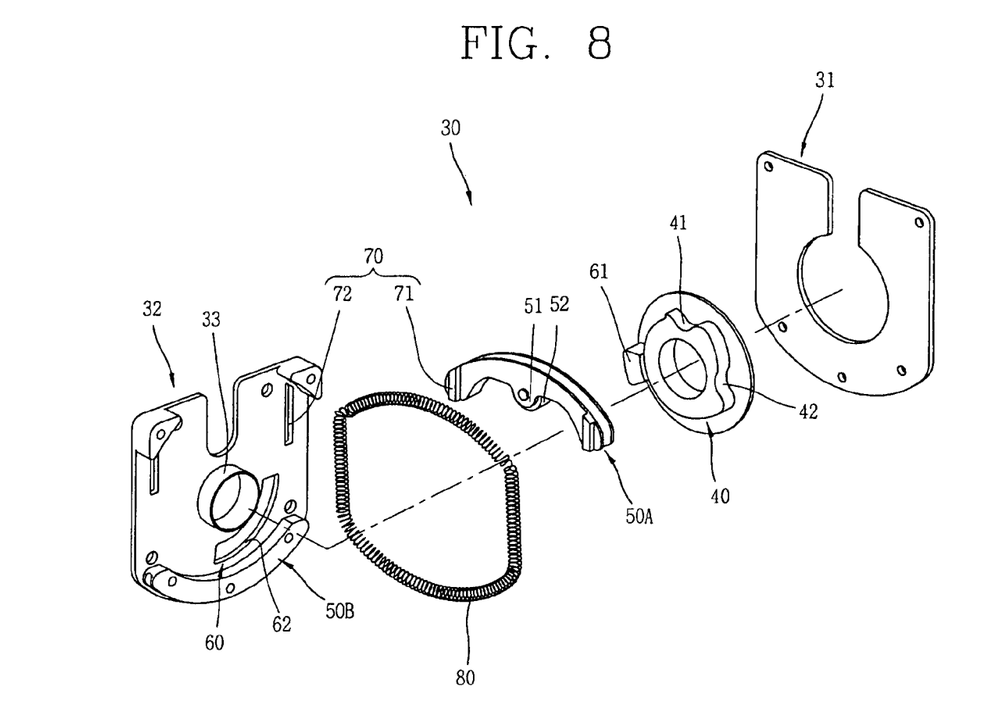
FIG. 8 is an entire exploded perspective view illustrating the hinge module in FIG. 6.

Turning next to FIGS. 6-8, which are exploded views of the hinge module 30 shown in FIGS. 1 and 2. As shown in FIGS. 6 and 8, the hinge module 30 includes first and second hinge members 31 and 32 configured to be installed in parallel and formed into a plate. The first hinge module 31 is formed on the upper surface of the first body 10 and the second hinge module 32 is formed on the lower surface of the second body 20 at a position corresponding to the first body 10.

FIGS. 6 and 8 also illustrate the second hinge member 32 having a shaft 33 disposed perpendicularly to the first and second hinge members 32. The shaft 33 also supports the first hinge member 31 such that the first hinge member 31 is horizontally rotatable with respect to the second hinge member 32. In addition, as shown in FIGS. 7 and 8, the first and second hinge members 31 and 32 and the shaft 33 have a hole therein through which a connector passes to electrically connect the first and second bodies 10 and 20.

In addition, an elastic force mechanism is provided between the first and second hinge members 31 and 32 to thereby provide an elastic force in a rotation direction when the first hinge member 31 is rotated with respect to the second hinge member 32. In more detail, as shown in FIGS. 7 and 8, the elastic force mechanism includes a fixed cam 40 fixed on the first hinge member 31. The fixed cam 40 also includes a cam profile formed on an outer circumferential surface thereof.

The elastic force mechanism also includes cams 50A and 50B and a spring 80 installed around the cams 50A and 50B. In the example shown in FIG. 4, the cam 50A is moveable whereas the cam 50B is not. The spring 80 elastically provides a rotating force to the cam 50A. That is, the cam 50A is linearly movable in a radial direction around the fixed cam 40 on the first hinge member 31 such that the second body 20 may be rotated with respect to the first body 10. In more detail, the cam profile of the fixed cam 40 is formed at an angle of 90° clockwise from a closed position of the second body 20 so that the second body 20 is stopped at its closed position and at its opened position after being rotated 90°.

In addition, as shown in FIG. 8, the fixed cam 40 includes a first curved portion 41 and a second curved portion 42 on an outer circumferential surface thereof. The first curved portion 41 is curved to stop the second body 20 at the closed position and the second curved portion 42 is formed to stop the second body 20 at its open position. That is, the first and second curved portions 41 and 42 of the fixed cam 40 interact with the moving cam 50A to stop the second body 20 at both its open and closed positions. In addition, in the above description, only the first cam 50A is moveable. However, if the cam profile of the fixed cam 40 is formed to be double symmetrical centering on the shaft 33, the second moving cam 50B can also be installed to be movable in the radial direction.

In addition, as shown in FIGS. 7 and 8, the first moving cam 50A includes a protruding stopping protrusion 51 that contacts with the cam profile of the fixed cam 40, and a rolling wheel 52 provided at the stopping protrusion 51. Thus, the moving cam 50 moves along an upper portion of the cam profile of the fixed cam 40 such that the second body 20 may be rotated 900 with respect to the first body 10. Further, the rolling wheel 52 reduces a frictional force of the moving cam 50A and thus the second body 20 may be smoothly rotated.

FIGS. 6-8 also illustrate the hinge module 30 including a guide part 70 formed between the second hinge member 32 and the first moving cam 50A. The guide part 70 is configured to allow the first moving cam 50A to be linearly moved toward and away from the shaft 33 (or the fixed cam 40). In more detail, the guide part 70 includes a slot type guide groove 72 formed in the second hinge member 32 and a guide protrusion 71 formed on the first moving cam 50A. Thus, the guide protrusion 71 slides within the guide groove 72. In addition, the guide part 70 is preferably disposed at both ends of the first moving cam 50A to prevent the first moving cam 50A from shaking when the cam 50A is moved.

Further, the spring 80 is formed to surround the first and second cams 50A and 50B so the spring 80 can be easily assembled. However, because the spring 80 need only provide an elastic force to pull the first and second cams 50A and 50B towards each other, the spring 80 can be also formed to connect both ends of the first and second moving cams 50A and 50B such that the cams 50A and 50B are pulled together.

In addition, FIGS. 6-8 further illustrate the hinge module 30 including a stopper part 60 provided between the second hinge member 32 and the fixed cam 40 to allow the first hinge member 31 to be stopped at an accurate stop position with respect to the second hinge member 32. As shown, the stopper part 60 includes an arc-shaped guide groove 62 on the second hinge member 32 and a stopper protrusion 61 protruding from the fixed cam 40. A length of the guide groove 66 corresponds to a rotation available angle of the second body 20.

Figure 9:
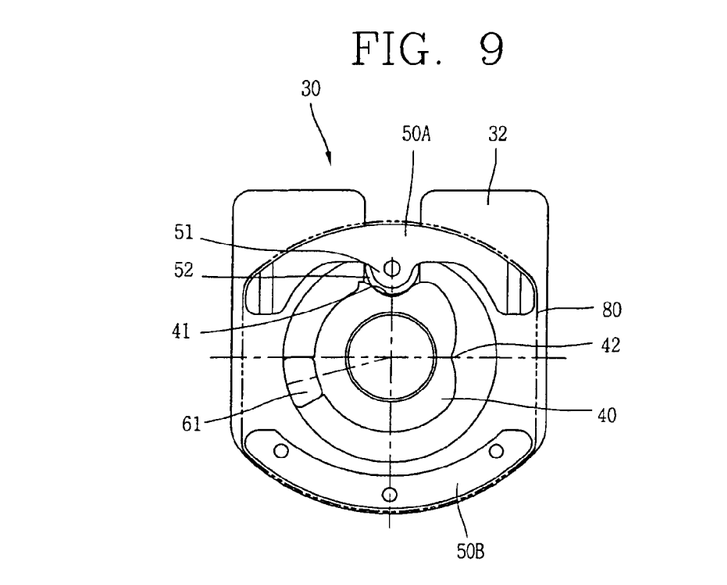
FIGS. 9 to 11 are overviews respectively illustrating operational states of the hinge module in FIG. 6.
Figure 10:
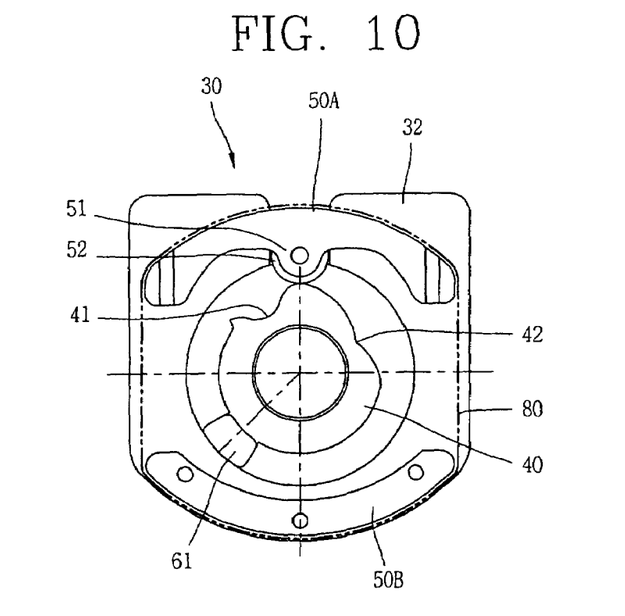
Figure 11:
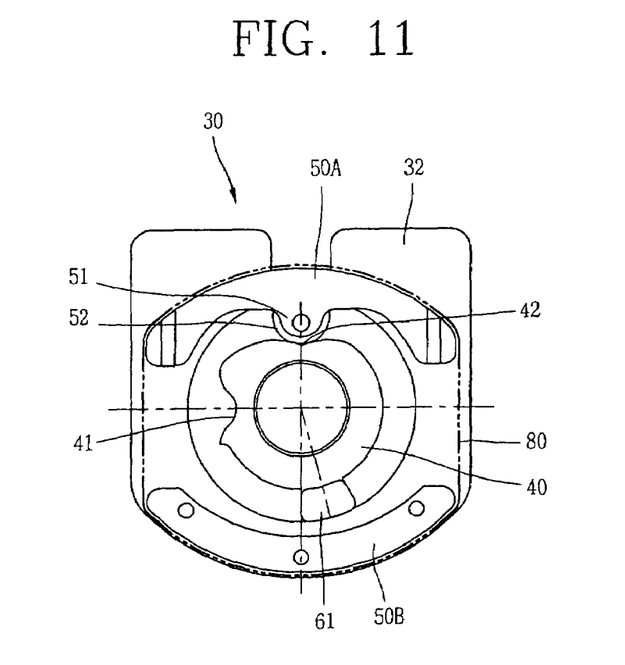

An operation of the hinge module 30 will now be described with reference to FIGS. 9-11. In more detail, FIG. 9 illustrates a state in which the second body 20 is closed with respect to the first body 10. As shown, the stopping protrusion 51 of the first moving cam 50A and the rolling wheel 52 are stopped at the first curved portion 41 of the fixed cam 40. As shown in FIG. 10, when the second body 20 is slightly rotated clockwise, the fixed cam 40 is rotated in the opposite direction and the first cam 50A moves in a direction away from the second cam 50B.

In addition, while the fixed cam 40 is being rotated, the stopping protrusion 51 and the rolling wheel 52 pass a dead point existing between the first and second curved portions 41 and 42. At this moment, the first cam 50A moves closer to the second cam 50B by virtue of the elastic force of the spring 80. Thus, the second body 20 is automatically rotated in the direction that it was initially rotated. Further, as shown in FIG. 11, when the stopping protrusion 51 and the rolling wheel 52 reach the second curved portion 42, the second body 20 is stopped from rotating.

Figure 12:
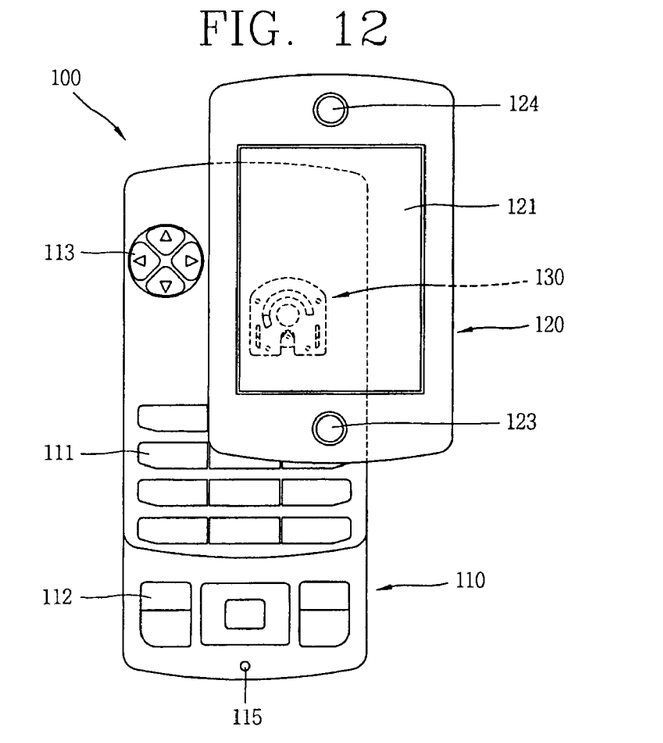
FIG. 12 is a plan view illustrating an opened state of a display body of the mobile terminal according to a second embodiment of the present invention.

Turning next to FIG. 12, which is a plan view illustrating an opened state of a mobile terminal 100 according to a second embodiment of the present invention. As shown, the mobile terminal 100 includes a first body 110, a second body 120 and a hinge module 130. The hinge module 130 is disposed in the upper right hand corner between the first and second bodies 110 and 120 and is configured to allow the second body 120 to rotate 9020 and 180° with respect to the first body 110. FIG. 12 illustrates the second body 120 being rotated 180° with respect to the first body 110.

Further, as shown in FIG. 12, the mobile terminal 110 includes a first keypad 111 that is exposed when the second body 120 is rotated 90°, a second keypad 112 that is always exposed, and a third keypad 113 that is exposed when the second body 120 is rotated 180°. The first and second keypads 111 and 112 perform the same roles as that of the keypads 11 and 12 in the first embodiment of the present invention. The third keypad 113 is preferably a direction keypad including directional arrows. The mobile terminal 100 also includes a display 121 on the second body 120, speakers 123 and 124 and a microphone 115 (similar to the first embodiment).

Thus, when the second body 120 is rotated 90° and 180°, the display 121 displays both horizontal and vertical screens. For example, when the second body 121 is rotated 90° similar to the first embodiment, the display 121 is horizontal and the first keypad 111 is exposed. Thus, the user can perform an editing operation, etc. using the first keypad 111 and viewing the display 121 horizontally. Then, when the second body is rotated another 90° (i.e., a total of 180°), the third keypad 113 is also exposed and the display 121 is vertically and slightly shifted to the right of the first body 110. Thus, in this instance, the user can play games or perform a searching operation using the directional keys on the third keypad 113.

Figure 13:
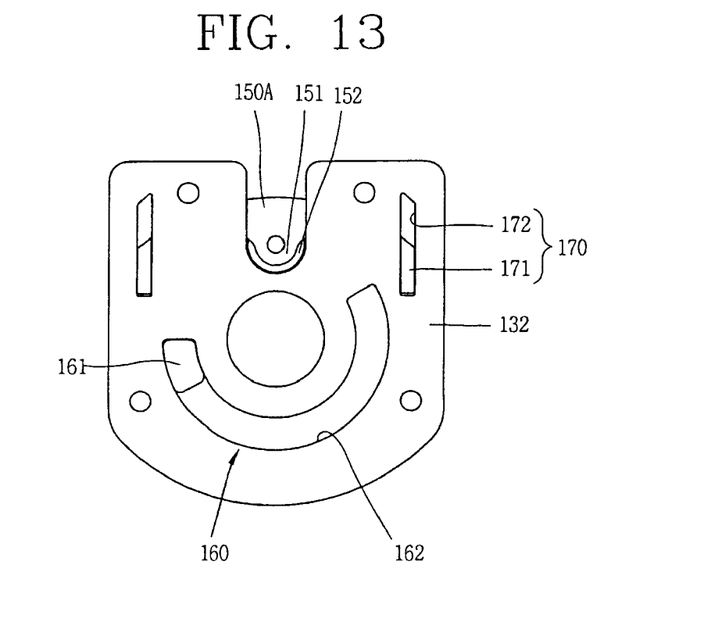
FIG. 13 is a plan view of a hinge module of the mobile terminal in FIG. 12.

Next, FIG. 13 is a plan view illustrating the hinge module 130 of the mobile terminal in FIG. 12. As shown, the hinge module 130 includes a first moving cam 150A installed to be linearly movable with respect to a fixed cam (not shown in FIG. 13). The hinge module 130 also includes a stopper part 160 having a guide groove 162 with a radius (length) of approximately 180° and a stopper protrusion 161 configured to make the second hinge member 132 stop accurately at a 180° rotation point with respect to a first hinge member (not shown).

Figure 14:
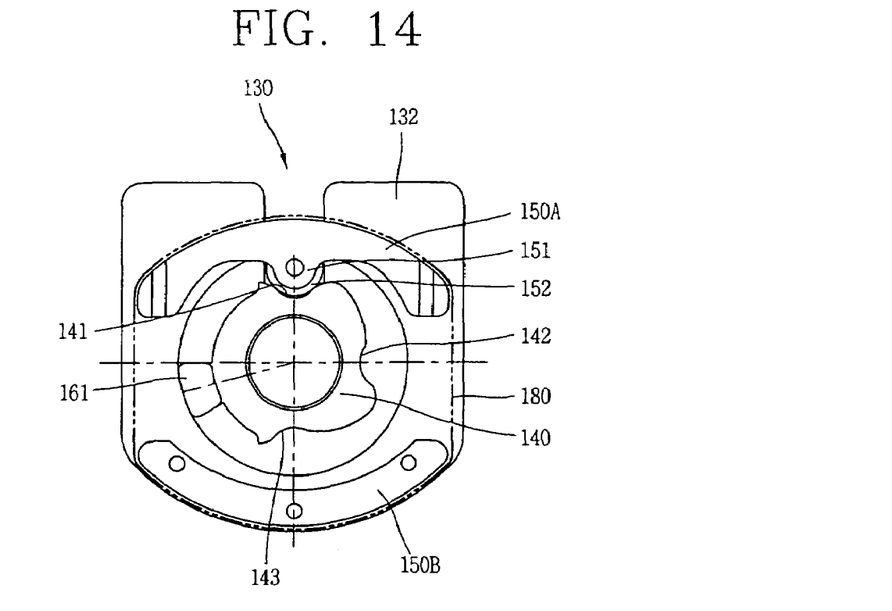
FIGS. 14 to 18 are overviews respectively illustrating operational states of the hinge module in FIG. 12.

Further, as shown in FIG. 14, an outer surface of a fixed cam 140 includes a first curved portion 141 configure to catch the moving cam 150 when the second body 120 is closed with respect to the first body 110, a second curved portion 142 configured to catch the moving cam 150 when the second body 120 is rotated by 90°, and a third curved portion 143 configured to catch the moving cam 150 when the second body is rotated 180°. In addition, similar to the first embodiment, the hinge module 130 also includes a second cam 150B, a stopping protrusion 151, a rolling wheel 152 and a spring 180.

Figure 15:
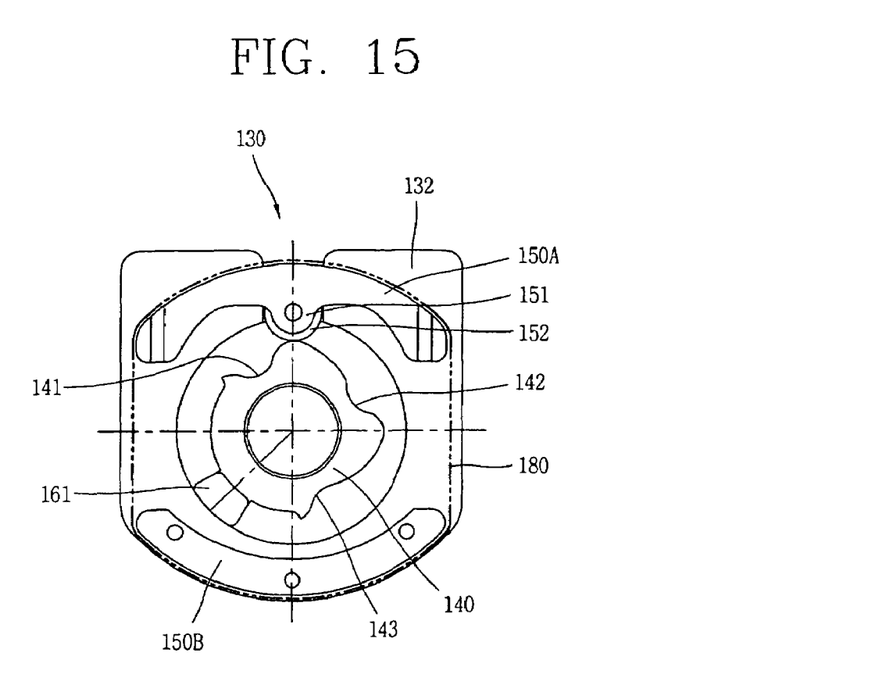

An operation of the hinge module 130 will now be described with respect to FIGS. 14-18. As shown in FIG. 14, when the second body 120 is closed with respect to the first body 110, the stopping protrusion 151 and the rolling wheel 152 are engaged in the first curved portion 141 of the fixed cam 140. As shown in FIG. 15, when the second body 120 is slightly rotated clockwise, the first cam 150A moves in a direction away from the second cam 150B. Further, as in the first embodiment, when the fixed cam 140 is being rotated, the stopping protrusion 151 and the rolling wheel 152 pass a dead point existing between the first and second curved portions 141 and 142. At this moment, the first cam 150A moves closer to the second cam 150B by virtue of the elastic force of the spring 180. Thus, the second body 120 is automatically rotated in the direction that it was initially rotated.

Figure 16:
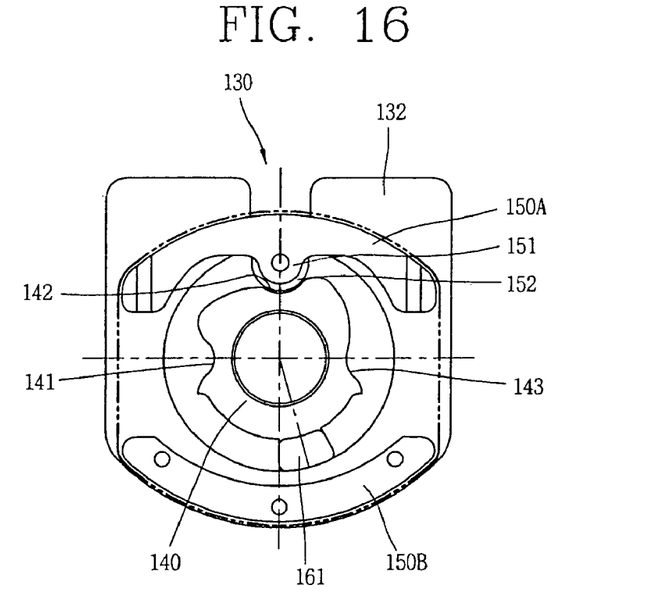
Figure 17:
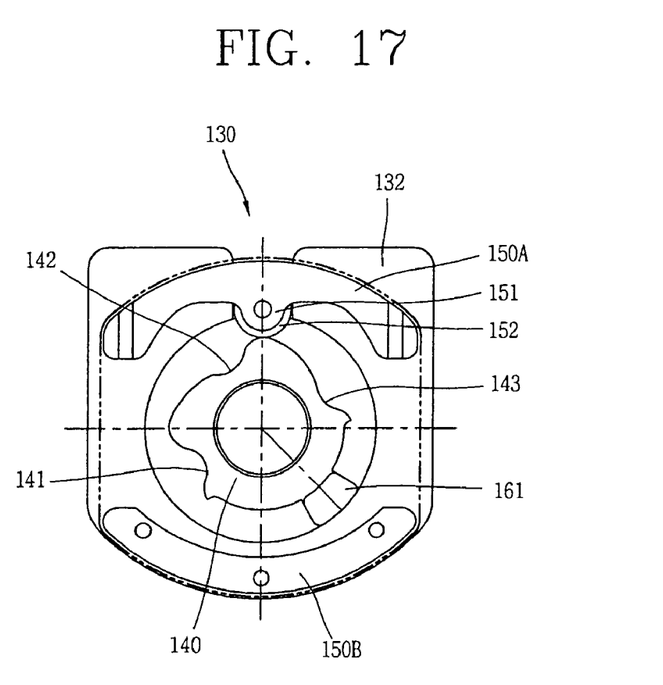

FIG. 16 illustrates the stopping protrusion 151 and the rolling wheel 152 engaging the second curved portion 142 such that the second body 120 is stopped from rotating. In addition, as shown in FIG. 17, when the second body 120 is further slightly rotated clockwise, the stopping protrusion 151 and the rolling wheel 152 pass a dead point existing between the second and third curved portions 142 and 143.

Figure 18:
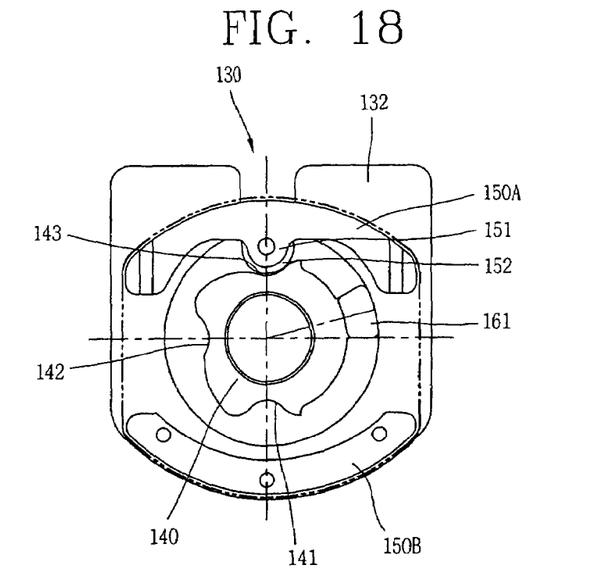

At this moment, the first cam 150A moves in a direction closer to the second cam 150B by the elastic force of the spring 180. Thus, the second body 120 is automatically rotated in the direction that the second body 120 was initially rotated. Further, as shown in FIG. 18, the stopping protrusion 151 and the rolling wheel 152 then engage the third curved portion 143 such that the second body 120 is stopped from rotating.

Figure 19:
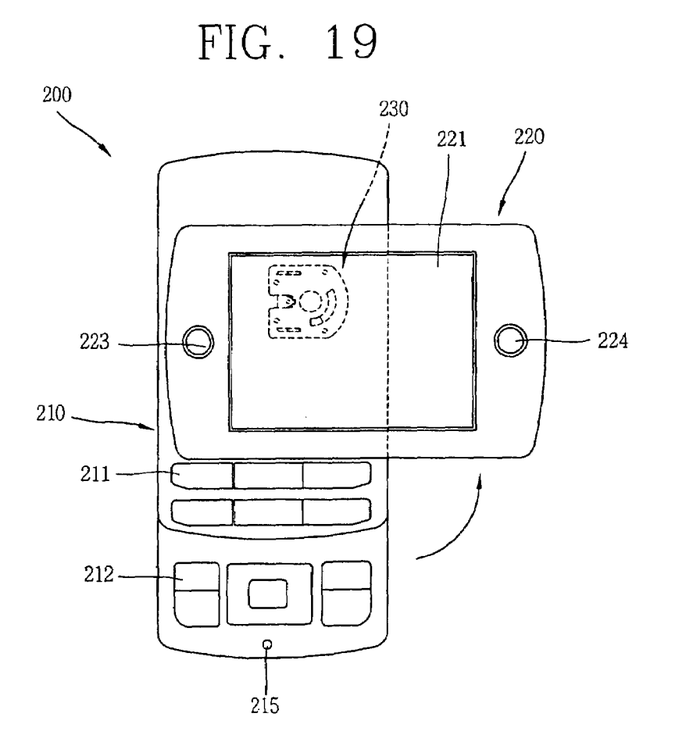
FIG. 19 is a plan view showing an opened state of a display body of the mobile terminal according to a third embodiment of the present invention.

Turning now to FIG. 19, which is a plan view illustrating a mobile terminal 200 according to a third embodiment of the present invention. As shown, the mobile terminal is an opened state when the second body 200 is rotated 90° counterclockwise with respect to the first body 210. In this state, the display 221 is a horizontal screen so an image can be displayed horizontally and not upside down. As in the other embodiments, the mobile terminal 200 also includes speakers 223 and 224, first body 210, keypads 211 and 221, microphone 215 and hinge module 230. Further, a cam profile of the fixed cam in the hinge module 230 is formed in both directions so that the second body 220 can be rotated counterclockwise to be opened and then clockwise to be closed.

Figure 20:
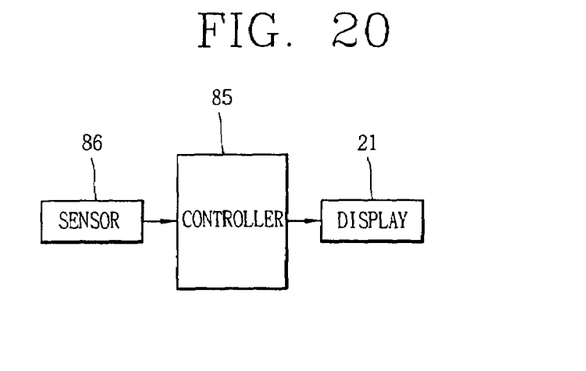
FIG. 20 is a control block diagram illustrating the mobile terminal according to the embodiments of the present invention.

Next, FIG. 20 is a control block diagram of mobile terminal according to an embodiment of the present invention. As shown in FIG. 20, the mobile terminal includes a controller 85 for changing a mode of the terminal according to a rotational direction and/or an angle of the second body. Also included is at least one sensor 86 for sensing the rotational direction and angle of the second body and for transmitting a corresponding signal to the controller 85. The sensor 86 is positioned so as to be able to detect the rotational direction and angle of the second body. For example, the sensor 86 may be provided between the first and second bodies.

In addition, the sensor 86 is preferably a Hall affect switch that can sense a magnet (not shown) on one of the first and second bodies. Accordingly, when the sensor 86 senses the rotational direction and/or angle of the second body, the sensor 86 transmits a corresponding signal to the controller 85 and the controller 85 changes a corresponding screen mode of the mobile terminal. For example, the controller 85 may change an image displayed on the display 87 from a horizontal screen to a vertical screen or a vertically reversed image. The mobile terminal described with respect to FIG. 20 can be applied any embodiment of the present invention described above.

Figure 21:
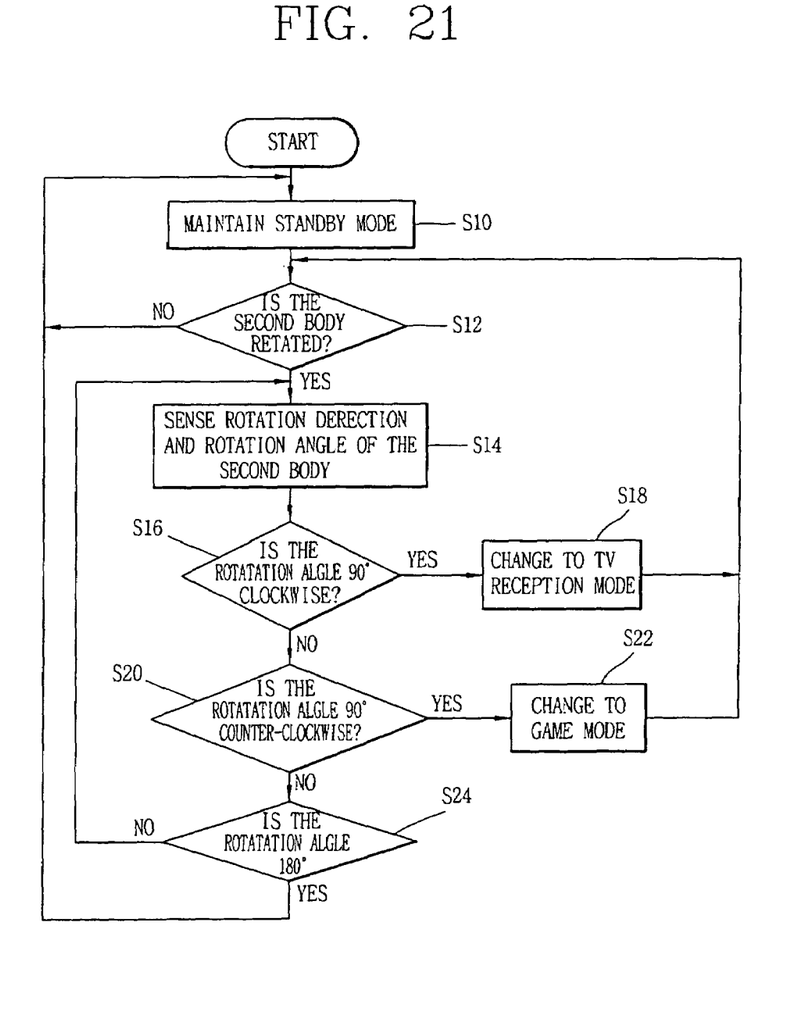
FIG. 21 is a flowchart illustrating a method for changing a screen mode of the mobile terminal according to an embodiment of the present invention.

Turning next to FIG. 21, which is a flowchart illustrating a method for changing a screen mode of the mobile terminal according to an embodiment of the present invention. FIG. 20 will also be referred to in this description. As shown in FIG. 21, the mobile terminal is in a standby state when the second body is closed over the first body (S10). The controller 85 then determines if the second body has rotated (S12). If the second body has been rotated (Yes in S12), the sensor 86 senses the rotation direction and rotation angle of the second body (S14).

The controller 55 then determines if the rotation angle is 90° clockwise (S16). For example, FIG. 2 illustrates the second body 20 being rotated 90° in a clockwise direction. If the rotation angle is 90° in the clockwise direction (Yes in S16), the controller 85 changes the mode of the terminal into the TV reception mode (S18). If the rotation angle is not 90° in a clockwise direction (No in S16), the controller 85 determines if the rotation angle is 90° counter-clockwise (S20). If the rotation angle is 90° in the counter-clockwise direction (Yes in S20), the controller 85 changes the mode of the terminal into the Game mode (S22). If the rotation angle is not 90° in the counter-clockwise direction (No in S20), the controller 85 determines if the rotation angle is 180° (S24). If the rotation angle is 180° (Yes in S24), the method returns to step S10. Otherwise (No in S24), the method returns to step S14.

In addition, the particular mode to which the terminal is automatically changed by the controller 85 can be previously stored and an additional key manipulation by the user is not necessary. Thus, the user can automatically change the terminal to various desired modes according to a rotation of the second body by changing the particular mode stored in the memory as necessary. In addition, the particular mode can be at least one of standby mode and call mode and text transmitting mode, etc.

As so far described, the mobile terminal and the mode changing method according to embodiments of the present invention have many advantages. For example, a portion of the first body that is exposed when the second body is opened is enlarged because the hinge module is disposed to be eccentric to one of the left and right sides between the first and second bodies. Therefore, a larger keypad may be installed in the exposed portion of the first body. Thus, the mobile terminal may be better utilized. In addition, because the direction of the image displayed on the display is automatically changed by rotating the second body, an optimum screen for the user to enjoy a video or watch TV is provided.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal comprising:
a first body;
a second body covering at least a portion of the first body; and
a hinge module disposed to be eccentric to one of upper left and right sides between the first and second bodies and configured to allow the second body to be horizontally rotatable with respect to the first body,
wherein the second body has a shorter length than the first body such that when the second body is closed with respect to the first body via the hinge module, a first portion of the first body not covered by the second body is exposed,
wherein the first body comprises:
a first keypad installed on a second portion of the first body that is covered by the second body when the second body is closed with respect to the first body via the hinge module, and
a second keypad installed on the first portion of the first body not covered by the second body when the second body is closed with respect to the first body via the hinge unit, and
wherein the hinge module is further configured to allow the second body to be rotated 90° such that the first and second portions of the first body are exposed to enlarge an exposed portion of the first body.

2. The terminal of claim 1, further comprising:
a first keypad mounting portion for mounting the first keypad in a recess portion of the first body; and
a second keypad mounting portion for mounting the second keypad.

3. The terminal of claim 2, wherein an upper surface edge of the second keypad mounting portion is substantially flush with an upper surface of the second body.

4. The terminal of claim 1, wherein the second body includes a display, and when the second body is closed with respect to the first body, the display provides a vertical screen, and when the second body is rotated by 90° with respect to the first body so as to be opened, the display provides a horizontal screen.

5. The terminal of claim 4, wherein the second body is rotated by 90° and 180° with respect to the first body so as to be opened and closed.

6. The terminal of claim 5, further comprising:
a third keypad additionally exposed when the second body is rotated by 180° so as to be opened.

7. The terminal of claim 6, wherein the third keypad is a direction keypad including directional keys.

8. The terminal of claim 5, wherein when the display is rotated by 180° so as to be opened, the display provides both horizontal and vertical screens.

9. The terminal of claim 1, further comprising:
first and second speakers provided at upper and lower ends of the second body.

10. The terminal of claim 1, wherein the hinge module comprises:
first and second hinge members installed parallel to an upper surface of the first body and a lower surface of the second body corresponding to the first body, respectively; and
a shaft disposed perpendicularly to the first and second hinge members and configured to support the first hinge member such that the first hinge member is horizontally rotatable with respect to the second hinge member.

11. The terminal of claim 10, wherein the hinge module further comprises:
an elastic force mechanism provided between the first and second hinge members and configured to provide an elastic force in a rotation direction when the first hinge member is rotated with respect to the second hinge member.

12. The terminal of claim 11, wherein the elastic force mechanism comprises:
a fixed cam fixed at one of the first and second hinge members and having a cam profile on an outer circumferential surface thereof;
a moveable cam configured to move around at least a portion of the fixed cam according to a rotation of the second body with respect to the first body; and
a spring installed around the moveable cam and configured to elastically press the moveable cam towards the fixed cam.

13. The terminal of claim 12, wherein the cam profile of the fixed cam comprises first and second curved portions at which a stopping protrusion of the moveable cam is engaged within to allow the second body to be stopped both at a closed position and at an opened position after being rotated by 90°, respectively.

14. The terminal of claim 13, wherein the fixed cam further comprises a third curved portion at which the stopping protrusion of the moveable cam is engaged within to allow the second body to be stopped at the opened position after being rotated by 180°.

15. The terminal of claim 14, further comprising:
another cam disposed on one of the first and second hinge members not having the moveable cam and being disposed symmetrically with respect to the moveable cam such that the spring surrounds both of the cams.

16. The terminal of claim 12, wherein the moveable cam further comprises a rolling wheel configured to contact and roll along the cam profile of the fixed cam.

17. The terminal of claim 12, further comprising:
a guide part formed in one of the first or second hinge members and configured to allow the moveable cam to linearly move toward and away from the other cam.

18. The terminal of claim 17, wherein the guide part comprises:
a guide recess having a slot-form in one of the first and second hinge members; and
a guide protrusion formed on the movable cam and configured to be guided in the guide recess.

19. The terminal of claim 12, wherein the cam profile of the fixed cam is formed to allow the second body to be rotated in one of a clockwise direction or counter-clockwise direction with respect to the first body.

20. The terminal of claim 1, further comprising:
a controller configured to change a screen mode of the terminal according to at least one from a rotation direction and an angle of the second body.

21. The terminal of claim 20, further comprising:
at least one sensor configured to sense said at least one from the rotation direction and angle of the second body and to transmit a corresponding signal to the controller.

* * * * *